United States Patent [19]

Wilfert et al.

[11] 4,045,052

[45] Aug. 30, 1977

[54] PASSENGER MOTOR VEHICLE

[75] Inventors: Karl Wilfert, Gerlingen-Waldstadt; Walter Schmid, Sindelfingen; Arno Jambor, Vaihingen, Enz, all of Germany

[73] Assignee: Daimler-Benz Aktiengesellschaft, Germany

[21] Appl. No.: 573,076

[22] Filed: Apr. 30, 1975

[30] Foreign Application Priority Data

May 2, 1974 Germany .............................. 2421206

[51] Int. Cl.² .............................................. B60G 9/00
[52] U.S. Cl. ................................. 280/701; 267/20 A; 267/60; 280/724
[58] Field of Search ............... 280/124 R, 124 A, 666, 280/670, 696, 701, 724, 106.5 R; 267/19 A, 20 A, 60

[56] References Cited

U.S. PATENT DOCUMENTS

| | | | |
|---|---|---|---|
| 1,171,942 | 2/1916 | Goodwin | 280/696 |
| 1,439,626 | 12/1922 | Hotto | 267/60 |
| 1,888,989 | 11/1932 | Kratky | 267/60 |
| 2,596,209 | 5/1952 | Chausson | 267/60 |
| 3,019,030 | 1/1962 | Marchetti | 280/124 R |
| 3,044,799 | 7/1962 | Fiala | 280/124 R |
| 3,415,535 | 12/1968 | Gamard | 280/124 R |

Primary Examiner—Joseph F. Peters, Jr.
Assistant Examiner—John A. Carroll
Attorney, Agent, or Firm—Craig & Antonelli

[57] ABSTRACT

A passenger motor vehicle with a vehicle body means and with two axles carrying the body, and in which the body is supported with respect to at least one of the two axles by way of elastic axle guide elements and is rotatable at least with respect to this one axle about an axis of instantaneous rotation extending generally in the vehicle longitudinal direction and disposed at least approximately at the height of its center of gravity; the axle guide elements thereby form simultaneously spring elements for the vertical spring system of this one axle while the axle guide elements are of such construction that the vehicle body is transversely displaceable in a translatory manner with respect to this axle.

58 Claims, 14 Drawing Figures

PASSENGER MOTOR VEHICLE

The present invention relates to a passenger motor vehicle with a vehicle body which is supported at least with respect to one of the two vehicle axles supporting the same by way of elastic axle guide elements and is rotatable at least with respect to this vehicle axle about an axis of instantaneous rotation which extends in the vehicle longitudinal direction and is disposed at the height of or above its center of gravity.

In a known construction of this type, the vehicle body is supported with respect to at least one of the vehicle axles by way of the elastic axle guide elements in such a manner that with axle guide elements which are elastic principally in the shearing direction and are formed by rubber block bearing supports, the surfaces of the axle guide elements adjoining the vehicle body and the surfaces adjoining the vehicle axle extend at least approximately in the circumferential direction of circles drawn about the axis of instantaneous rotation (German Pat. No. 1,261,001). A stabilization of the vehicle and a tilting of the vehicle body opposite to the centrifugal force about the axis instantaneous rotation is to be achieved by this arrangement with mechanical expenditures which are still bearable for the series production. However, the transmission of transverse vibrations and transverse shocks onto the vehicle body cannot be prevented thereby because a coupling between the cross movements and rotational movements about the longitudinal axis of the vehicle always exists.

The present invention, in contradistinction thereto, is concerned with the task to so further develop a passenger motor vehicle having the aforementioned constructional features that a vehicle arrangement results far-reachingly insulating also transverse vibrations or swinging movements, which by reason of its base construction also offers the possibility for further simplifications in the drive chassis, especially with small and light weight vehicles.

According to the present invention, this is achieved with a passenger motor vehicle of the aforementioned type in that the elastic axle guide elements simultaneously form the exclusive spring elements for the vertical spring system of the vehicle axle constructed as rigid axle and are so constructed that the vehicle body is transversely displaceable in a translatory manner with respect to the axle. The solution according to the present invention, in which at the outset separate spring elements for the wheels are dispensed with as regards one vehicle axle, enables especially with the aimed-at simple type of construction, a relatively high driving comfort if the mass of the axle is relatively small. This can be achieved without difficultes for the front axle especially with small vehicles having a rear drive. It is additionally also appropriate particularly for such types of vehicles if exclusively one elastic element is provided for the axle guidance which with its center of action lies at least at the height of the center of gravity of the vehicle body and is arranged in the center longitudinal plane of the vehicle. The support of the vehicle axle constructed as rigid axle with respect to this elastic element can take place preferably by way of diagonal struts coordinated to the axle and forming together with the axle carrier a trussing connection, whereby the diagonal struts start from the ends of the axle carrier and are disposed together with the same essentially in an upright vehicle transverse plane. A construction which can be built very short can also be thus achieved, as is desirable, for example, for so-called city vehicles as regards the aimed-at small dimensions of the vehicle. Such a construction and support of the vehicle axle becomes effective in an advantageous manner on the driving behavior of the vehicle, and additionally can be readily controlled also by the use of corresponding anisometrically constructed elastic elements.

In conjunction with an axle guidance according to the present invention which is intended for the one axle of the vehicle whose support with respect to the vehicle body may take place by way of one axle guide element, or also by way of several axle guide elements, especially by way of two axle guide elements mutually displaced or offset in the vehicle transverse direction, other types of axle constructions may be used for the second axle. Thus, the second axle, which is springily connected with the vehicle body at least essentially exclusively in the vertical direction, may be constructed within the scope of the present invention, for example, as rigid axle or may include an independent wheel suspension in which the guide members for the wheels are directly connected with the vehicle body. Such an independent wheel suspension may be coordinated, for example, to each vehicle side whereby the larger masses, for example, the engine, transmission or the like are arranged above the axles thereof. Such an independent wheel suspension may additionally also be provided in conjunction with an auxiliary frame construction, for example, in the form of a so-called drive stool, in which the drive stool is connected vibration-absorbing in the customary manner with the vehicle body, whereby it is then appropriate to utilize the drive stool as engine support, carrier for the rear axle or the like. With such a construction the drive stool, in its turn, may then be connected with the vehicle body within the scope of the present invention also by way of elastic axle guide elements which are constructed as vertical spring elements and/or possess a construction which enables a translatory transverse displacement of the vehicle body with respect to the drive stool.

A preferred construction according to the present invention essentially consists in providing for both axles of the vehicle, elastic axle guide elements serving simultaneously as spring elements for the vertical spring system which are additionally so constructed that the vehicle body is transversely displaceable in a translatory manner with respect to the axles. It is advantageous with such a construction if only one axle guide element is coordinated to one of the two axles and two axle guide elements mutually offset in the vehicle transverse direction are coordinated to the other axle since such a three-point support enables also a favorable stabilization of the vehicle body, for example, during the boarding of the passengers of the vehicle.

It is additionally possible within the scope of the present invention to provide at least one crank in the connection of the second axle to the vehicle body, whereby the crank is preferably so arranged that the crank pin coordinated to the axle is located higher than the crank pin coordinated to the vehicle body. The crank provided for the axle guidance is thereby preferably so arranged that the axis of instantaneous rotation of the vehicle body determined by the one crank pin is located at least at the height of the center of gravity thereof so that the vehicle body is able to assume a tilting toward the inside of the curve under the influence of centrifugal forces. In lieu of one crank, of course, also two cranks may be provided. The crank may be provided in conjunction with a rigid axle also in case of an independent wheel suspension whereby the wheels are then springily supported at a drive stool.

In one embodiment of the present invention, the web of the crank may be constructed elastically or springily in its longitudinal direction so that also with the use of a crank the vertical spring system can be realized by way of the axle guide element.

In order to preclude instabilities with vehicle constructions of the type described above, in which the vehicle body is able to carry out at least with respect to one of the vehicle axles, transverse and translatory movements and in which the vehicle body for that reason is isolated far-reachingly against rolling and transverse swinging movements or vibrations, especially also at higher velocities which are caused by centrifugal forces that excite rotary oscillations or vibrations about the vertical axis, it is appropriate if a connection exists between the two axles which precludes a horizontal, lateral relative movement. For that purpose, the two vehicle axles carrying the vehicle body may be connected by way of diagonal tension struts or tie bars interconnected or linked together at the point of intersection thereof.

Accordingly, it is an object of the present invention to provide a passenger motor vehicle which avoids by simple means the aforementioned shortcomings and drawbacks encountered in the prior art.

Another object of the present invention resides in a passenger motor vehicle, especially of small dimensions, in which the transmission of transverse vibrations and shocks to the vehicle body is at least far-reachingly prevented.

A further object of the present invention resides in a passenger motor vehicle which is of slight dimensions and light weight, offers the possibility for simplifications in its chassis construction and isolates the body far-reachingly against transverse vibrations and oscillations.

Still a further object of the present invention resides in a passenger motor vehicle of the type described above which combines a high driving comfort with simplicity in construction involving a vehicle of relatively short length and light weight.

Another object of the present invention resides in a passenger motor vehicle which enables a favorable stabilization of the vehicle body, even during ingress and egress of the passengers.

Still another object of the present invention resides in a passenger motor vehicle in which the vehicle body will tilt toward the inside of the curve under the influence of the centrifugal forces, when driving through a curve.

These and other objects, features and advantages of the present invention will become more apparent from the following description when taken in connection with the accompanying drawing which shows, for purposes of illustration only, several embodiments in accordance with the present invention, and wherein:

FIGS. 1 – 9 are schematic side elevational views of a passenger motor vehicle constructed in accordance with the present invention, in which at least one axle is constructed as rigid axle and in which the elastic axle guide elements coordinated to this axle form simultaneously the sole spring elements for the vertical spring system, whereby the various figures illustrate different further axle constructions for the second axle thereof;

FIG. 10 is a somewhat schematic longitudinal cross-sectional view through a passenger motor vehicle according to the present invention in which exclusively a connection precluding horizontal lateral relative movements exists between the two vehicle axles and in which the vertical spring system for both vehicle axles constructed as rigid axle takes place by way of elastic axle guide elements which are so arranged and constructed that the vehicle body is transversely displaceable in a translatory manner with respect to the axle;

Figure 11:
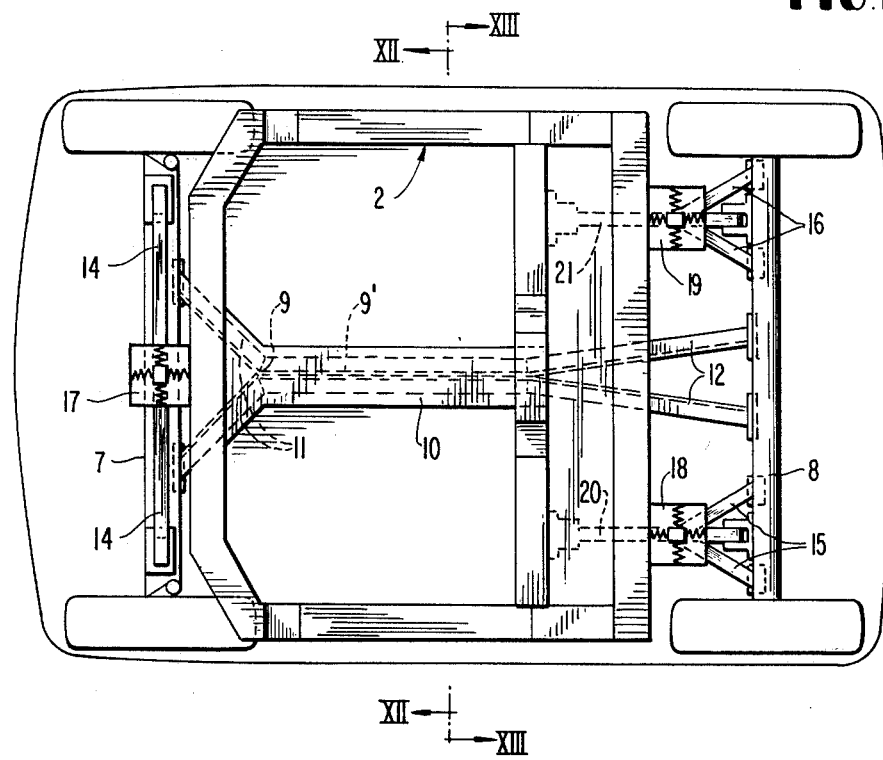
FIG. 11 is a somewhat schematic plan view on the passenger motor vehicle according to FIG. 10.
Figure 12:
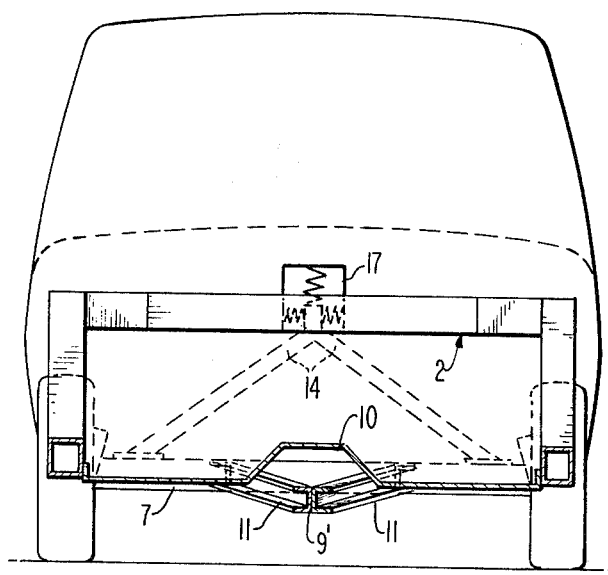
FIG. 12 is a somewhat schematic cross-sectional view taken along line XII–XII in FIG. 11.
Figure 13:
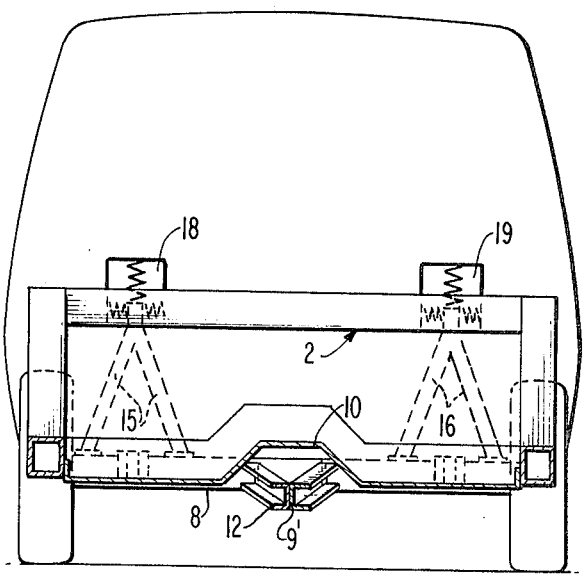
Figure 14:
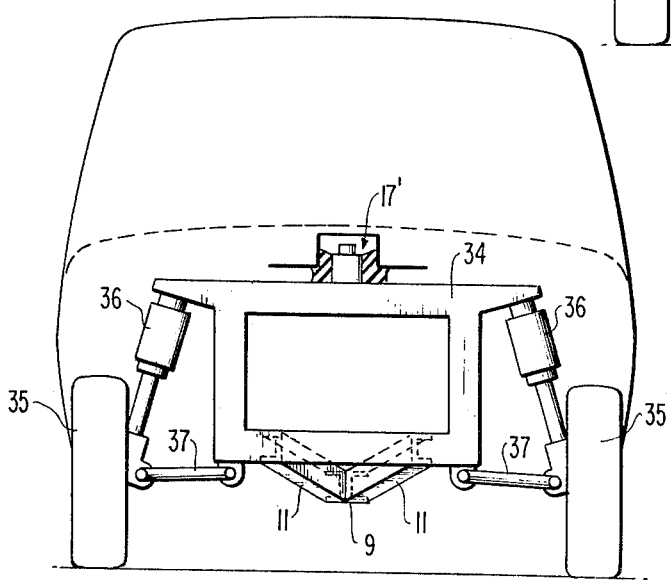

FIG. 13 is a somewhat schematic cross-sectional view taken along line XIII—XIII in FIG. 11; and FIG. 14 is a somewhat schematic transverse cross-sectional view, corresponding to FIG. 12, of a further embodiment of a passenger motor vehicle in accordance with the present invention in which the wheel guidances for the independently suspended wheels are provided in a drive stool, and in which this drive stool, in its turn, is supported with respect to the vehicle body by way of an elastic axle guide element which enables a vertical spring support and by means of which the vehicle body is transversely displaceable translatorily with respect to the axle.

Referring now to the drawing wherein like reference numerals are used throughout the various views to designate like parts, and more particularly to FIGS. 10 to 13, the embodiments according to FIGS. 10 to 13 which will be described at first, illustrate schematically a passenger motor vehicle of relatively smaller dimensions which might be referred to according to its construction and conception as city vehicle and whose vehicle body generally designated by reference numeral 1 includes at least the passenger cell, however, preferably together with the passenger cell also the outer body panels for the entire vehicle as also illustrated in the drawing. The frame generally designated by reference numeral 2 thereby also belongs to the passenger cell, by way of which the passenger cell or the vehicle body is connected with the chassis generally designated by reference numeral 3 which in the illustrated embodiment includes a front axle generally designated by reference numeral 4 and a rear axle generally designated by reference numeral 5 as well as a connection generally designated byreference numeral 6 between the front axle 4 and the rear axle 5 which has the purpose to preclude horizontal lateral relative movements between the two axles 4 and 5.

As is illustrated in particular in FIGS. 12 and 13, both axles 4 and 5 include rigid members 7 and 8, and these two axle members 7 and 8 are connected with each other by the frame bearer 9 forming the connection 6, which is so constructed that it possesses according to the present invention a slight torsional rigidity combined with a high bending strength. The connection of the frame bearer 9 which, as shown in FIGS. 10 to 13, extends longitudinally in the center underneath the vehicle body and is partly located in a correspondingly extending tunnel 10 of the vehicle body provided within the area of the passenger cell, to the rigid axle member 7 and 8 take place by way of its V-shaped forked ends 11 and 12. The aimed-at high bending strength with small torsional rigidity is realized according to the present invention within the frame of the illlustrated embodiment in that the frame bearer 9 has a double T-shaped cross section within its center section 9'. This leads to an altogether simple construction of the frame bearer 9 since the latter can be assembled of two U-shaped angle profiles open toward opposite sides which form individually by themselves respectively an arm of the bearer within the area of the V-shaped ends 11 and 12 and which are connected into the double-T-profile within the area of the center section 9'. The arms of the V-shaped ends 11 and 12 of the frame bearer 9 adjoin the axle members 7 and 8 in a conventional manner.

The connection of the axle members 7 and 8 with the elastic axle guide elements 17 and 18, 19 provided in their connection to the vehicle body 1, takes place in the illustrated embodiment respectively by way of support struts 14 for the front axle and by way of support struts 15 and 16 for the rear axle. The support struts 14 coordinated to the front axle member 7 are thereby disposed essentially in the vertical axle plane and form a triangular trussing which is so constructed that starting from the axle guide element 17 disposed in the vehicle longitudinal center plane and provided above the axle, the support struts 14 extend obliquely outwardly symmetrically to the vehicle longitudinal center plane where they are mounted with their ends appertaining to the axle member 7 either rigidly or detachably at the axle member 7.

The support struts 15 and 16 coordinated to the rear axle member 8 are arranged extending obliquely upwardly with an inclination toward the front axle, whereby the struts 15 and 16, respectively, starting respectively from the axle member 8 as base converge in the associated axle guide elements 18 and 19. Longitudinal guide members 20 and 21 serve for the support in the vehicle longitudinal direction which are pivotally connected at the axle member 8 and at the vehicle body 1 or at the frame thereof. The places of pivotal connection are thereby preferably constructed elastically in order to assure also a sufficient lateral yieldingness.

Figure 3:
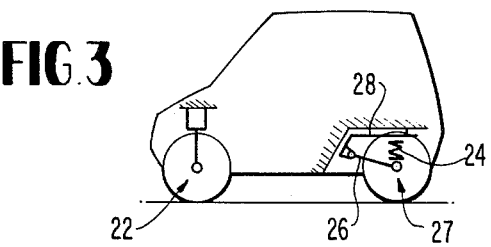
Figure 4:
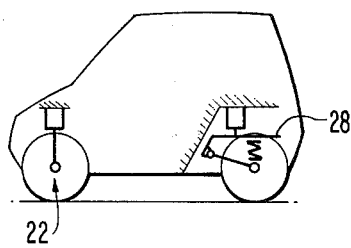
Figure 5:
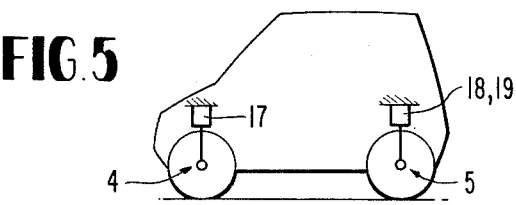

In the schematic illustrations according to FIGS. 1 to 9, different axle constructions are illustrated for the respective second axle which can be combined in an advantageous manner with an axle constructed according to the present invention. FIG. 5 thereby corresponds as illustration in principle to the embodiment according to FIGS. 10 to 13 whence the corresponding reference numerals are used and a detailed description thereof is dispensed with.

Figure 1:
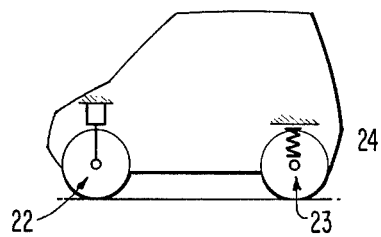

FIG. 1 illustrates in connection with a front axle generally designated by reference numeral 22 which as first axle is constructed according to the present invention and which corresponds, for example, to the front axle construction according to FIGS. 10 to 13, a rear axle construction generally designated by reference numeral 23, in which the rigid axle member is yieldingly or elastically supported exclusively in the upright direction by way of spring elements 24. Such a construction which excels by a high degree of simplicity, can be constructed particularly light-weight and consists especially also exclusively of proven elements, is suitable in particular when the load of the rear axle is not particularly large and the wheels thereof also are not driven. Both coil springs as well as leaf springs may serve as spring elements in such a construction. Especially in conjunction with a pneumatic or hydropneumatic spring system, a good stabilization of the vehicle body with respect also to one-sided, nearly static loads, as occur, for example, during the boarding, can be achieved with such a construction with the use of a front axle construction according to the present invention.

Figure 2:
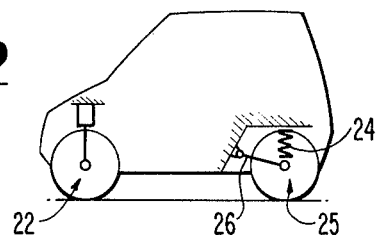

FIG. 2 illustrates an embodiment in which the rear axle generally designated by reference numeral 25 includes individual wheel spring systems whereby the longitudinal guidance is realized by way of guide members 26 and spring elements 24 are coordinated to each wheel. Such a construction is appropriate, for example, with a driven rear axle, with larger rear axle loads or also when additional control or steering effects are to be attained by the rear axle, for example, when driving through a curve.

In the embodiment according to FIG. 3, a rear axle generally designated by reference numeral 27 is used in conjunction with a front axle 22 according to the present invention, which includes wheels individually supported with respect to a drive stool 28 forming an auxiliary frame by way of springs 24 and guide members 26. Consequently, in the embodiments according to FIGS. 1 to 3 described hereinabove, in addition to the axle 22 according to the present invention which permits a translatory cross-displaceability of the vehicle body with respect to the axle and for which the point of rotation in relation to the transverse displaceability and pivotability with respect to the vehicle body is determined by dynamic conditions (forces), axle constructions are used for the support of the vehicle body 1 which do not enable any translatory transverse displaceability. Mixed conditions result therefrom in relation to the behavior of the vehicle body 1 with respect to the vehicle axles, which depending on the use of the vehicle may lead altogether to a meaningful overall construction.

FIG. 4 illustrates a further development of the solution according to FIG. 3, since now the drive stool 28 is no longer connected with the vehicle body 1 in the usual manner but instead by way of elastic axle guide elements which form additional vertical spring elements and by way of which the drive stool 28 is simultaneously held transversely displaceable in a translatory manner with respect to the vehicle body. Such a solution is an example for a construction as to how the support of the vehicle body according to the present invention with respect to the axles can be utilized also in heavy vehicles, especially if large masses are coordinated to one axle, for example, by way of the engine and therefore also a spring support of these masses must be aimed at. Simultaneously, such a double spring support of course signifies an improvement of the comfort, especially also with respect to the damping of vibrations.

Figure 6:
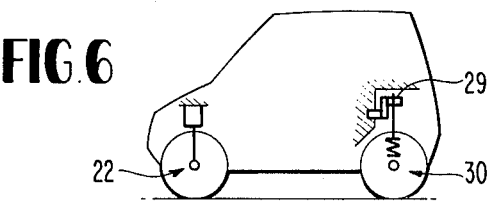
Figure 8:
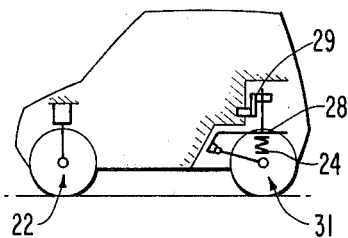

Whereas with the use of elastic axle guide elements, as were used in connection with the embodiment illustrated in FIGS. 10 to 13, no coupling exists between the cross movements and the rotary movements about the vehicle longitudinal axis, i.e., translatory transverse-displacements are therefore possible and the point of rotation or the axis of rotation is not geometrically fixed in the case of rotary movements, but is determined by dynamic conditions (forces), the use of cranks 29 according to FIGS. 6 and 8 for the second axle also entails the possibility of transverse-displacements, but now coupled with rotary movements about a geometrically fixed axis of rotation. Pure translatory cross movements are not possible with the use of cranks. In conjunction with an axle 22 which forms in this case the front axle, the use of one or also of two cranks for the second axle, in the embodiments of FIGS. 6 and 8 therefore for the rear axle 30 and 31, and in particular in the case of two cranks in an arrangement similar to that for the rear axle in the embodiment according to FIGS. 10 to 13, may unquestionably entail advantages and more particularly as regards the stabilization of the vehicle during the boarding and leaving of the vehicle. In the case of the rear axle 30 (FIG. 6), the cranks 29 are thereby connected with the axle member, properly speaking, by way of springs whereas in the case of the rear axle 31 (FIG. 8) the guidance of a drive stool 28 is taken over by the cranks 29, whereby the independent wheel suspensions are supported at the drive stool 28 by means of the springs 24.

Figure 7:
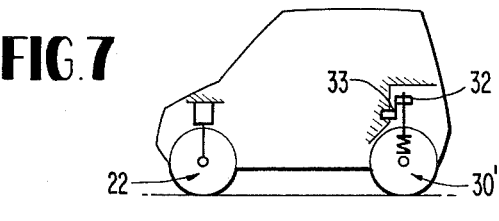
Figure 9:
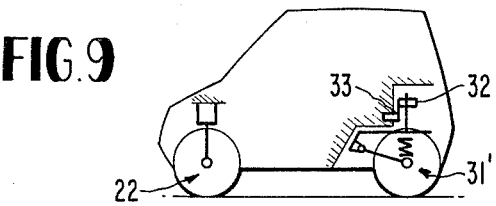
Figure 10:
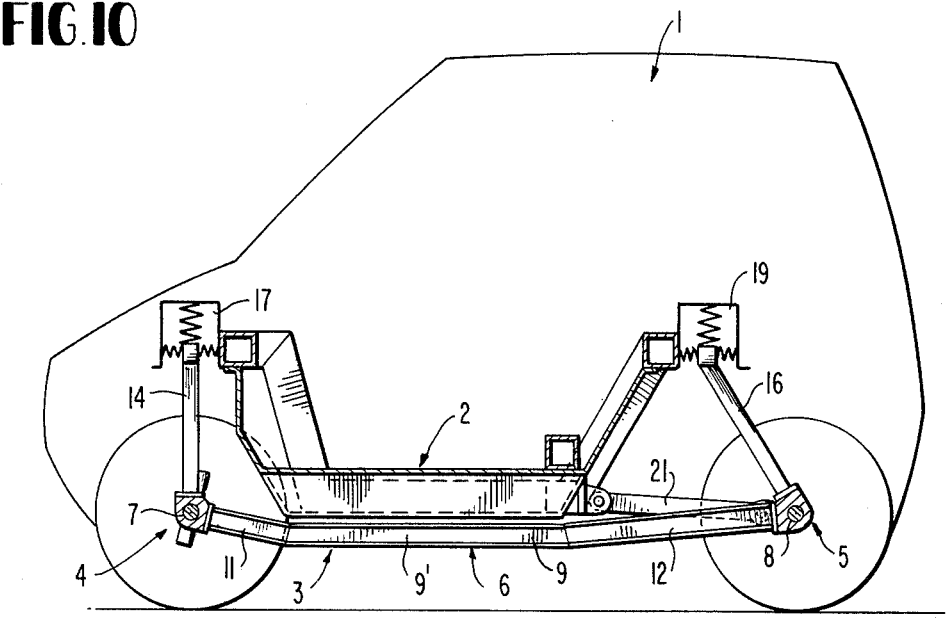

Embodiments are illustrated in FIGS. 7 and 9 corresponding to FIGS. 6 and 8 whereby, however, the cranks 32 are now telescopically yielding in the direction of their web 33 by conventional means so that no exact geometric determination of the axis of instantaneous rotation exists any longer for the rear axle 30' (FIG. 7) and 31' (FIG. 9) but instead an intermediate condition exists between solutions in which the axis of instantaneous rotation is determined only by dynamic conditions (forces) and such solutions in which an exact geometric fixing exists.

FIG. 14 illustrates an axle suspension similar to that as is described in connection with FIG. 4 for the rear axle, in application to the front axle in an embodiment according to FIGS. 10 to 13 so that now the elastic axle guide element generally designated by reference numeral 17' is connected with a drive stool 34 forming an auxiliary frame, at which is secured the frame bearer 9 by way of its V-shaped ends 11. The wheels 35 are secured at the drive stool 34 by way of the spring and damping means 36 as well as the guide members 37.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A passenger motor vehicle comprising a vehicle body, two axle means carrying the vehicle body, said vehicle body being supported with respect to at least one of the two axle means by way of elastic axle guide means, and said vehicle body being rotatable at least with respect to said one axle means about an axis of instantaneous rotation extending generally in the vehicle longitudinal direction and being disposed at least approximately at the height of its center of gravity, characterized in that the elastic axle guide means form simultaneously spring means for a vertical spring system of the one axle means, and in that said elastic axle guide means are of such construction that the vehicle body is transversely displaceable in a translatory manner with respect to at least the one axle means.

2. A passenger motor vehicle according to claim 1, characterized in that the elastic axle guide means include elastic elements forming simultaneously the exclusive spring means for the vertical spring system of the vehicle axle means, said spring means being so constructed that the vehicle body is additionally transversely displaceable translatorily with respect to at least the one axle means.

3. A passenger motor vehicle according to claim 1, characterized in that means are provided for connecting the two axles so as to preclude a horizontal lateral relative movement.

4. A passenger motor vehicle according to claim 3, characterized in that said connection means for connecting the two axles include diagonal tensional strut means.

5. A passenger motor vehicle according to claim 4, characterized in that means are provided for linking the strut means at a point of intersection.

6. A passenger motor vehicle according to claim 1, characterized in that a bearer means having a center section essentially in a center longitudinal plane of the vehicle is provided for connecting the two axle means with each other.

7. A passenger motor vehicle according to claim 6, characterized in that the bearer means includes essentially V-shaped end portions connected with the respective axle means.

8. A passenger motor vehicle according to claim 7, characterized in that the vehicle body includes a tunnel, and in that the center section of the bearer means is arranged at least in part within said tunnel.

9. A passenger motor vehicle according to claim 8, characterized in that the elastic axle guide means includes elastic means for enabling elastic movements of at least the one axle means with respect to the vehicle body in the transverse direction.

10. A passenger motor vehicle according to claim 9, characterized in that the elastic means also enables elastic movements in a vertical as well as in a longitudinal direction.

11. A passenger motor vehicle according to claim 10, characterized in that the elastic means is located substantially in the center of the vehicle, the one axle means is a rigid front axle, and in that the elastic axle guide means include support members connected to and extending from the outer ends of the rigid front axle toward the elastic means.

12. A passenger motor vehicle according to claim 11, characterized in that the support members are upwardly inwardly inclined from their connection with the rigid front axle.

13. A passenger motor vehicle according to claim 12, characterized in that the other of the two axle means is a rear axle, and the elastic axle guide means includes elastic means for enabling elastic movement of the rear axle in a transverse direction.

14. A passenger motor vehicle according to claim 8, characterized in that the elastic axle guide means include elastic means for enabling elastic movements of said two axle means with respect to the vehicle body in a transverse direction.

15. A passenger motor vehicle according to claim 14, characterized in that the elastic means also enables elastic movements of said two axle means with respect to the vehicle body in a vertical as well as in a longitudinal direction.

16. A passenger motor vehicle according to claim 15, characterized in that the elastic means is located substantially in the center of the vehicle, the one axle means is a rigid front axle, and in that the elastic axle guide means include support members connected to and extending from the outer end of the rigid front axle toward the elastic means.

17. A passenger motor vehicle according to claim 16, characterized in that the support members are upwardly inwardly inclined from their connection with the rigid front axle.

18. A passenger motor vehicle comprising a vehicle body, two axles carrying the vehicle body, said vehicle body being rotatable at least with respect to a first of the two axles about an axis of instantaneous rotation extending generally in the vehicle longitudinal direction and being disposed at least approximately at the height of its center of gravity and translatively displaceable with respect to the two axles, characterized in that said first axle is fashioned as a rigid axle, a single elastic axle guide means is provided for supporting the vehicle body with respect to said first axle, and in that said single elastic axle guide means is arranged in a longitudinal plane of symmetry of the vehicle body and provides for a vertical springing of said first axle, said single elastic axle guide means is arranged in the vehicle so that the center of gravity thereof lies at least at the height of the center of gravity of the vehicle body.

19. A passenger motor vehicle according to claim 18, characterized in that the single elastic axle guide means includes spring means forming sole spring elements for a vertical spring system of the first axle.

20. A passenger motor vehicle according to claim 19, characterized in that the second of said two axles is constructed as a rigid axle.

21. A passenger motor vehicle according to claim 19, characterized in that the axis of instantaneous rotation is located above the center of gravity.

22. A passenger motor vehicle according to claim 19, characterized in that spring means are provided for connecting the second of said two axles with the vehicle body.

23. A passenger motor vehicle according to claim 22, characterized in that said spring means connects the second of said two axles with the vehicle body at least essentially only in a vertical direction.

24. A passenger motor vehicle according to claim 23, characterized in that the second of said two axles is constructed as a rigid axle.

25. A passenger motor vehicle according to claim 23, characterized in that the second of said two axles includes an independent suspension for wheels of the vehicle.

26. A passenger motor vehicle according to claim 25, characterized in that an auxiliary frame means is provided for connecting the independently suspended wheels of the second of said two axles with the vehicle body.

27. A passenger motor vehicle according to claim 26, characterized in that the auxiliary frame means is a drive stool means.

28. A passenger motor vehicle according to claim 26, characterized in that a further elastic axle guide means is provided for connecting the auxiliary frame means with the vehicle body so that the vehicle body in relation to the second of said two axles has an axis of instantaneous rotation disposed also at least approximately at its center of gravity and extending generally in a vehicle longitudinal direction.

29. A passenger motor vehicle according to claim 28, characterized in that the last-mentioned axis of instantaneous rotation is located above the center of gravity.

30. A passenger motor vehicle according to claim 29, characterized in that the further elastic axle guide means supports said auxiliary frame means with respect to the vehicle body in such a manner so as to be vertically spring-supported and also transversely movable in a translatory manner.

31. A passenger motor vehicle according to claim 18, characterized in that at least one crank means is provided for connecting the second of said two axles with the vehicle body.

32. A passenger motor vehicle according to claim 31, characterized in that the crank means includes two crank arms disposed essentially in the vertical plane.

33. A passenger motor vehicle according to claim 32, characterized in that the crank means is provided with a web elastic in a longitudinal direction.

34. A passenger motor vehicle according to claim 31, characterized in that means are provided for connecting the two axles so as to preclude a horizontal lateral relative movement.

35. A passenger motor vehicle according to claim 34, characterized in that said connection means for connecting the two axles includes diagonal tensional strut means.

36. A passenger motor vehicle according to claim 35, characterized in that means are provided for linking the strut means at a point of intersection.

37. A passenger motor vehicle according to claim 36, characterized in that the second of said two axles is constructed as a rigid axle.

38. A passenger motor vehicle according to claim 36, characterized in that the second of said two axles includes an independent suspension for wheels of the vehicle.

39. A passenger motor vehicle according to claim 38, characterized in that an auxiliary frame means is provided for connecting the independently suspended wheels of the second of said two axles with the vehicle body.

40. A passenger motor vehicle according to claim 39, characterized in that a further elastic axle guide means is provided for connecting the auxiliary frame means with the vehicle body so that the vehicle body in relation to the second of said two axles has an axis of instantaneous rotation disposed also at least approximately at its center of gravity and extending generally in the vehicle longitudinal direction.

41. A passenger motor vehicle according to claim 40, characterized in that the further elastic axle guide means supports said auxiliary frame means with respect to the vehicle body in such a manner as to be vertically spring-supported and also transversely movable in a translatory manner.

42. A passenger motor vehicle according to claim 18, characterized in that the second of said two axles is constructed as a rigid axle.

43. A passenger motor vehicle according to claim 18, characterized in that the second of said two axles includes an independent suspension for wheels of the vehicle.

44. A passenger motor vehicle according to claim 43, characterized in that an auxiliary frame means is provided for connecting the independently suspended wheels of the second of said two axles with the vehicle body.

45. A passenger motor vehicle according to claim 44, characterized in that a further elastic axle guide means is provided for connecting the auxiliary frame means with the vehicle body so that the vehicle body in relation to the second of said two axles has an axis of instantaneous rotation disposed also at least approximately at its center of gravity and extending generally in a vehicle longitudinal direction.

46. A passenger motor vehicle according to claim 45, characterized in that the further elastic axle guide means supports said auxiliary frame means with respect to the vehicle body in such a manner so as to be vertically spring-supported and also transversely movable in a translatory manner.

47. A passenger motor vehicle according to claim 18, wherein said single elastic axle guide means is fashioned as a single anisometrically elastic element.

48. A passenger motor vehicle according to claim 18, characterized in that the first axle is a front axle, and in that support members extending from the outer ends of the front axle toward the center of the vehicle are provided for connecting said front axle with said single elastic axle guide means.

49. A passenger motor vehicle according to claim 48, characterized in that the support members are upwardly inwardly inclined from their connection with the front axle.

50. A passenger motor vehicle according to claim 18, characterized in that two spring means are provided for connecting the second axle with the vehicle body, said two spring means being arranged on respective sides of the longitudinal center plane of the vehicle.

51. A passenger motor vehicle according to claim 50, characterized in that said two spring means provide an exclusive upright support of the vehicle body at the second axle.

52. A passenger motor vehicle according to claim 18, characterized in that support members extending from the outer ends of the first axle toward the center of the vehicle are provided for connecting the front axle with said single elastic axle guide means.

53. A passenger motor vehicle according to claim 52, characterized in that the support members are upwardly inwardly inclined from their connection with the front axle.

54. A passenger motor vehicle according to claim 53, characterized in that two spring means are provided for connecting the second axle with the vehicle body, said two spring means being arranged on respective sides of the longitudinal center plane of the vehicle.

55. A passenger motor vehicle according to claim 54, characterized in that said two spring means provide an exclusive upright support of the vehicle body at the second axle.

56. A passenger motor vehicle according to claim 52, characterized in that the support members are disposed in a vertical axle plane and form a triangular trussing with said single elastic axle guide means being arranged at an apex of the triangular trussing and said first axle forming at least a portion of the base of the triangular trussing.

57. A passenger motor vehicle according to claim 56, characterized in that two spring means are provided for connecting the second axle with the vehicle body, said two spring means being arranged on respective sides of the longitudinal center plane of the vehicle.

58. A passenger motor vehicle according to claim 57, characterized in that said two spring means provide an exclusive upright support of the vehicle body at the second axle.

* * * * *